(12) United States Patent
Watson et al.

(10) Patent No.: US 12,479,647 B2
(45) Date of Patent: Nov. 25, 2025

(54) PACKAGE CONFIGURED TO PRESERVE OR INHIBIT PATHOGENS ON PRODUCT, AND METHOD OF MAKING AND USING AT LEAST PORTIONS OF SAME

(71) Applicant: CSP TECHNOLOGIES, INC., Auburn, AL (US)

(72) Inventors: Neal D. Watson, Atlanta, GA (US); Michael A. Johnston, Marietta, GA (US); Jason Pratt, Auburn, AL (US); James S. Hollinger, Auburn, AL (US)

(73) Assignee: CSP Technologies, Inc., Auburn, AL (US)

( * ) Notice: Subject to any disclaimer, the term of this patent is extended or adjusted under 35 U.S.C. 154(b) by 173 days.

(21) Appl. No.: 18/047,100

(22) Filed: Oct. 17, 2022

(65) Prior Publication Data

US 2023/0079615 A1 Mar. 16, 2023

Related U.S. Application Data

(63) Continuation of application No. PCT/US2021/028605, filed on Apr. 22, 2021.

(60) Provisional application No. 63/013,658, filed on Apr. 22, 2020.

(51) Int. Cl.
*B65D 81/26* (2006.01)
*B65D 81/28* (2006.01)

(52) U.S. Cl.
CPC ........ *B65D 81/28* (2013.01); *B65D 81/264* (2013.01); *B65D 81/266* (2013.01)

(58) Field of Classification Search
CPC ..... B65D 81/28; B65D 81/266; B65D 81/264

USPC ......................................................... 206/204
See application file for complete search history.

(56) References Cited

U.S. PATENT DOCUMENTS

| | | | |
|---|---|---|---|
| 5,911,937 A | 6/1999 | Hekal | |
| 6,080,350 A | 6/2000 | Hekal | |
| 6,124,006 A | 9/2000 | Hekal | |
| 6,130,263 A | 10/2000 | Hekal | |
| 6,194,079 B1 | 2/2001 | Hekal | |
| 6,214,255 B1 * | 4/2001 | Hekal | B01J 20/28042 34/95 |
| 6,486,231 B1 | 11/2002 | Hekal | |
| 6,676,850 B2 | 1/2004 | Speronello et al. | |

(Continued)

FOREIGN PATENT DOCUMENTS

| | | |
|---|---|---|
| EP | 1462383 A1 | 9/2004 |
| JP | H01128828 A | 5/1989 |

(Continued)

OTHER PUBLICATIONS

International Search Report issued in PCT/US2021/028605, mailed Jul. 1, 2021.

(Continued)

*Primary Examiner* — Steven A. Reynolds
(74) *Attorney, Agent, or Firm* — Joshua Boyle; Eckert Seamans Cherin & Mellott, LLC

(57) ABSTRACT

A package (10) configured to preserve or prevent contamination through inhibition of pathogens of product therein includes an active member (26) co-extruded to a carrier (24). The combined active member and carrier can be attached to an interior surface of a package, optionally a lidding film (22) enclosing a cavity formed by a tray of the package.

29 Claims, 2 Drawing Sheets

(56) References Cited

U.S. PATENT DOCUMENTS

| | | |
|---|---|---|
| 7,005,459 B2 | 2/2006 | Hekal |
| 8,142,603 B2 * | 3/2012 | Sagona .............. B65D 81/2076 |
| | | 156/308.2 |
| 11,396,413 B2 * | 7/2022 | Voellmicke .......... B65D 75/367 |
| 2009/0067760 A1 | 3/2009 | Shelley et al. |
| 2016/0039955 A1 * | 2/2016 | Klein ................ B01J 20/28026 |
| | | 525/384 |
| 2019/0270069 A1 * | 9/2019 | Kibele .................... B32B 27/28 |
| 2019/0335746 A1 | 11/2019 | Freedman et al. |
| 2020/0016034 A1 * | 1/2020 | Voellmicke .......... B65D 75/327 |
| 2020/0352160 A1 * | 11/2020 | Pratt ......................... A01P 1/00 |

FOREIGN PATENT DOCUMENTS

| | | |
|---|---|---|
| JP | H1134238 A | 2/1999 |
| JP | 2003-221075 A | 8/2003 |
| JP | 2006306024 A | 11/2006 |
| JP | 2016163954 A | 9/2016 |
| JP | 2020-501992 A | 8/2019 |
| WO | 2019/163138 A1 | 8/2019 |
| WO | 2020102206 | 11/2019 |

OTHER PUBLICATIONS

Written Opinion issued in PCT/US2021/028605, mailed Jul. 1, 2021.

\* cited by examiner

PACKAGE CONFIGURED TO PRESERVE OR INHIBIT PATHOGENS ON PRODUCT, AND METHOD OF MAKING AND USING AT LEAST PORTIONS OF SAME

CROSS-REFERENCE TO RELATED APPLICATION

The present application is a continuation of PCT International Application No. PCT/US2021/028605, filed Apr. 22, 2021, which claims priority to U.S. Provisional Application No. 63/013,658, filed Apr. 22, 2021 and titled "PACKAGE CONFIGURED TO PRESERVE PERISHABLE PRODUCT, AND METHOD OF MAKING AND USING AT LEAST PORTIONS OF SAME," the entire disclosure of each is hereby incorporated by reference in its entirety.

FIELD

The presently disclosed technology relates generally to packages for containing product, such as, but not limited to, foodstuff or perishable items, and/or methods for attaching an active member to a carrier to increase the effectiveness of the active member to preserve product and/or prevent contamination of the product.

BACKGROUND AND DESCRIPTION OF RELATED ART

Various types of packaging require, or at least benefit from, controlled environmental conditions. For example, some products require the absence of moisture or environments with a specific narrow window for relative humidity within a package. Other products degrade in the presence of ethylene. Still, other products, e.g., produce, such as lettuce, may risk being exposed to contamination and would benefit from a means to address such contamination, e.g. through release of an antimicrobial compound in the headspace of a package.

It is known to heat stake antimicrobial film to the lidding film of a tray. Heat staking is a pulsed-heat process that joins two or more parts. The process deforms the material using heat and force for a set time. The bond is made by partially deforming one of the material in order to fix it to the other. A problem with this method is that the antimicrobial film can become brittle and fall off or separate from the lidding film, often crumbling into tiny pieces, which can become a contamination hazard for the product in the package. Another problem with this method is that some (e.g., half) of the surface area of the antimicrobial film is not available or accessible (i.e., because it is blocked by the attachment to the lidding film) for moisture uptake and resulting release of antimicrobial gas into headspace.

BRIEF SUMMARY

The presently disclosed technology overcomes the above and other drawbacks of the prior art.

One way to address the need for controlled environmental conditions for packaging of certain product is to provide an active member, optionally in the form of a film that has some type of absorbing, adsorbing, and/or releasing activity or capacity. Such an active member can optionally be an entrained polymer film with an active agent, e.g., a desiccant polymer or antimicrobial releasing polymer. Optionally, the entrained polymer film can also include a channeling agent to help regulate the sorption or release of a given material.

To overcome the above and/or other deficiencies of the prior art, the presently disclosed technology is optionally directed to coextruding an active member, optionally in the form of antimicrobial film, with a carrier, such as, but not limited, to a nonwoven material. Coextrusion is the process of pressing two or more materials through the same die to produce a single piece. The result can yield properties distinct from those of a single material. This optional method of the presently disclosed technology allows for more efficient use of the active material.

BRIEF DESCRIPTION OF THE DRAWINGS

The foregoing summary, as well as the following detailed description of the presently disclosed technology, will be better understood when read in conjunction with the appended drawings, wherein like numerals designate like elements throughout. For the purpose of illustrating the presently disclosed technology, there are shown in the drawings various illustrative embodiments. It should be understood, however, that the presently disclosed technology is not limited to the precise arrangements and instrumentalities shown. In the drawings.

DETAILED DESCRIPTION

Figure 1:
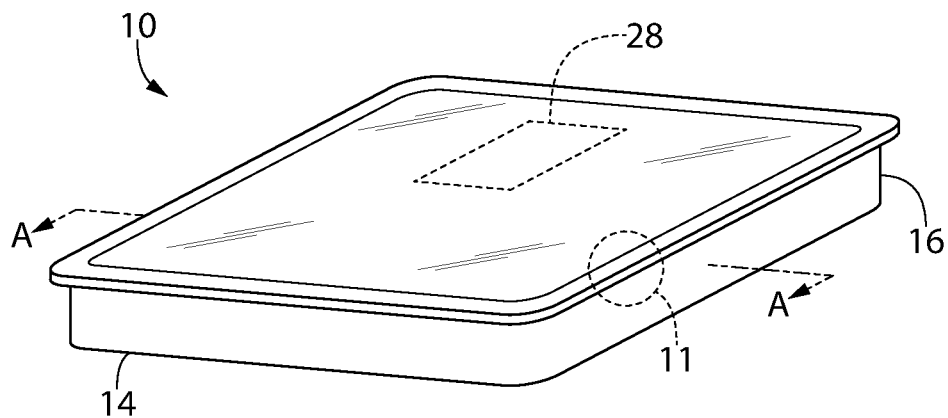
FIG. 1 is a perspective view of a package according to one optional embodiment of the presently disclosed technology, wherein a coextruded active member and carrier, as well as product, are shown in phantom for clarity of the invention only.

While systems, devices and methods are described herein by way of examples and embodiments, those skilled in the art recognize that the presently disclosed technology is not limited to the embodiments or drawings described. Rather, the presently disclosed technology covers all modifications, equivalents and alternatives falling within the spirit and scope of the appended claims. Features of any one embodiment disclosed herein can be omitted or incorporated into another embodiment.

Any headings used herein are for organizational purposes only and are not meant to limit the scope of the description or the claims. As used herein, the word "may" is used in a permissive sense (i.e., meaning having the potential to) rather than the mandatory sense (i.e., meaning must). Unless specifically set forth herein, the terms "a," "an" and "the" are not limited to one element but instead should be read as meaning "at least one." The terminology includes the words noted above, derivatives thereof and words of similar import.

As used herein, the term "active" is defined as capable of acting on, interacting with or reacting with a selected material (e.g., moisture or oxygen) according to the presently disclosed technology. Examples of such actions or interactions may include absorption, adsorption or release of the selected material. Another example of "active" is an agent capable of acting on, interacting with or reacting with a selected material in order to cause release of a released material.

As used herein, the term "active agent" is defined as a material that (1) can be immiscible with the base polymer and when mixed and heated with the base polymer and the channeling agent, will not melt, i.e., has a melting point that is higher than the melting point for either the base polymer or the channeling agent, and (2) acts on, interacts or reacts with a selected material. The term "active agent" may include but is not limited to materials that absorb, adsorb, or release the selected material(s).

The active agents of one embodiment of the presently disclosed technology are those that release antimicrobial gas(es), such as but not limited to chlorine dioxide gas. Active agents according to the presently disclosed technology can be in the form of particles such as minerals (e.g., molecular sieve or silica gel, in the case of desiccants), but the presently disclosed technology should not be viewed as limited only to particulate active agents. For example, in some embodiments, an oxygen scavenging formulation may be made from a resin which acts as, or as a component of, the active agent.

The term "antimicrobial releasing agent" refers to an active agent that is capable of releasing a released antimicrobial material, e.g. in gas form. This active agent may include an active component and other components (such as a catalyst and trigger) in a formulation (e.g., powdered mixture) configured to release the antimicrobial gas. A "released antimicrobial material" is a compound that inhibits or prevents the growth and proliferation of microbes and/or kills microbes, e.g., chlorine dioxide gas. The released antimicrobial material is released by the antimicrobial releasing agent. By way of example only, an antimicrobial releasing agent may be triggered (e.g., by chemical reaction or physical change) by contact with a selected material (such as moisture). For example, moisture may react with an antimicrobial releasing agent to cause the agent to release a released antimicrobial material.

As used herein, the term "base material" is a component (preferably a polymer) of an entrained active material, other than the active agent, that provides structure for the entrained material.

As used herein, the term "base polymer" is a polymer optionally having a gas transmission rate of a selected material that is substantially lower than, lower than or substantially equivalent to, that of the channeling agent. By way of example, such a transmission rate is a water vapor transmission rate in embodiments where the selected material is moisture and the active agent is an antimicrobial gas-releasing agent that is activated by moisture or a water-absorbing desiccant. This active agent may include an active component and other components in a formulation configured to release the antimicrobial gas. In one embodiment, the primary function of the base polymer is to provide structure for the entrained polymer.

Suitable base polymers for use in the invention include thermoplastic polymers, e.g., polyolefins such as polypropylene and polyethylene, polyisoprene, polybutadiene, polybutene, polysiloxane, polycarbonates, polyamides, ethylene-vinyl acetate copolymers, ethylene-methacrylate copolymer, poly(vinyl chloride), polystyrene, polyesters, polyanhydrides, polyacrylianitrile, polysulfones, polyacrylic ester, acrylic, polyurethane and polyacetal, or copolymers or mixtures thereof.

Referring to such a comparison of the base polymer and channeling agent water vapor transmission rate, in one embodiment, the channeling agent has a water vapor transmission rate of at least two times that of the base polymer. In another embodiment, the channeling agent has a water vapor transmission rate of at least five times that of the base polymer. In another embodiment, the channeling agent has a water vapor transmission rate of at least ten times that of the base polymer. In still another embodiment, the channeling agent has a water vapor transmission rate of at least twenty times that of the base polymer. In still another embodiment, the channeling agent has a water vapor transmission rate of at least fifty times that of the base polymer. In still another embodiment, the channeling agent has a water vapor transmission rate of at least one hundred times that of the base polymer.

As used herein, the term "channeling agent" or "channeling agents" is defined as a material that is immiscible with the base polymer and has an affinity to transport a gas phase substance at a faster rate than the base polymer. Optionally, a channeling agent is capable of forming channels through the entrained polymer when formed by mixing the channeling agent with the base polymer. Optionally, such channels are capable of transmitting a selected material through the entrained polymer at a faster rate than in solely the base polymer.

As used herein, the term "channels" or "interconnecting channels" is defined as passages formed of the channeling agent that penetrate through the base polymer and may be interconnected with each other.

As used herein, the term "entrained polymer" is defined as a monolithic material formed of at least a base polymer, an active agent and optionally also a channeling agent entrained or distributed throughout. An entrained polymer thus comprises at least two phases (without a channeling agent) or at least three phases (with a channeling agent). A "mineral loaded polymer" is a type of entrained polymer, wherein the active agent is in the form of minerals, e.g., mineral particles such as molecular sieve or silica gel. The term "entrained material" is used herein to connote a monolithic material comprising an active agent entrained in a base material wherein the base material may or may not be polymeric.

As used herein, the term "monolithic," "monolithic structure" or "monolithic composition" is defined as a composition or material that does not consist of two or more discrete macroscopic layers or portions. Accordingly, a "monolithic composition" does not include a multi-layer composite, although a monolithic composition may optionally serve as a discrete layer of a multi-layer composite.

As used herein, the term "phase" is defined as a portion or component of a monolithic structure or composition that is uniformly distributed throughout, to give the structure or composition its monolithic characteristics.

As used herein, the term "selected material" is defined as a material that is acted upon, by, or interacts or reacts with an active agent and is capable of being transmitted through the channels of an entrained polymer. For example, in embodiments in which a desiccant is used as an active agent, the selected material may be moisture or a gas that can be absorbed by the desiccant. In embodiments in which a releasing material is used as an active agent, the selected material may be an agent released by the releasing material, such as moisture, fragrance, or an antimicrobial agent (e.g., chlorine dioxide). In embodiments in which an adsorbing material is used as an active agent, the selected material may be certain volatile organic compounds and the adsorbing material may be activated carbon.

As used herein, the term "three phase" is defined as a monolithic composition or structure comprising three or more phases. An example of a three phase composition according to the invention is an entrained polymer formed of a base polymer, active agent, and channeling agent. Optionally, a three phase composition or structure may include an additional phase, e.g., a colorant, but is nonetheless still considered "three phase" on account of the presence of the three primary functional components.

Entrained polymers may be two phase formulations (i.e., comprising a base polymer and active agent, without a channeling agent) or three phase formulations (i.e., comprising a base polymer, active agent and channeling agent). Entrained polymers are described, for example, in U.S. Pat. Nos. 5,911,937, 6,080,350, 6,124,006, 6,130,263, 6,194,079, 6,214,255, 6,486,231, 7,005,459, U.S. Pat. Pub. No. 2016/0039955, U.S. Pat. Pub. No. 2019/0335746 and WO 2020/102206, each of which is incorporated by reference herein in its entirety.

An entrained material or polymer includes a base material (e.g., polymer) for providing structure, optionally a channeling agent and an active agent (collectively, sometimes referred to as an "active member"). The channeling agent forms microscopic interconnecting channels through the entrained polymer. At least some of the active agent is contained within these channels, such that the channels communicate between the active agent and the exterior of the entrained polymer via microscopic channel openings formed at outer surfaces of the entrained polymer. The active agent can be, for example, any one of a variety of absorbing, adsorbing or releasing materials, as described in further detail below. While a channeling agent is preferred, the invention broadly includes entrained materials that optionally do not include channeling agents, e.g., two phase polymers.

In any embodiment, suitable channeling agents may include a polyglycol such as polyethylene glycol (PEG), ethylene-vinyl alcohol (EVOH), polyvinyl alcohol (PVOH), glycerin polyamine, polyurethane and polycarboxylic acid including polyacrylic acid or polymethacrylic acid. Alternatively, the channeling agent can be, for example, a water insoluble polymer, such as a propylene oxide polymerisate-monobutyl ether, such as Polyglykol B01/240, produced by CLARIANT. In other embodiments, the channeling agent could be a propylene oxide polymerisate monobutyl ether, such as Polyglykol B01/20, produced by CLARIANT, propylene oxide polymerisate, such as Polyglykol D01/240, produced by CLARIANT, ethylene vinyl acetate, nylon 6, nylon 66, or any combination of the foregoing.

Suitable active agents according to the presently disclosed technology include absorbing materials, such as desiccating compounds. If the active agent is a desiccant, any suitable desiccant for a given application may be used. Typically, physical absorption desiccants are preferred for many applications. These may include molecular sieves, silica gels, clays and starches. Alternatively, the desiccant may be a chemical compound that forms crystals containing water or compounds which react with water to form new compounds.

Optionally, in any embodiment, the active agent may be an oxygen scavenger, e.g., an oxygen scavenging resin formulation.

Furthermore, the terms "package," "packaging" and "container" may be used interchangeably herein to indicate an object that holds or contains a good, e.g., food product and foodstuffs. Optionally, a package may include a container with a product stored therein. Non-limiting examples of a package, packaging and container include a tray, box, carton, bottle receptacle, vessel, pouch and flexible bag. A pouch or flexible bag may be made from, e.g., polypropylene or polyethylene. The package or container may be closed, covered and/or sealed using a variety of mechanisms including a cover, a lid, lidding sealant, an adhesive and a heat seal, for example. The package or container is composed or constructed of various materials, such as plastic (e.g., polypropylene or polyethylene), paper, Styrofoam, glass, metal and combinations thereof. In one optional embodiment, the package or container is composed of a rigid or semi-rigid polymer, optionally polypropylene or polyethylene, and preferably has sufficient rigidity to retain its shape under gravity.

Optionally, the active agent is a chlorine dioxide gas forming agent that may be provided in an entrained polymer of an active member. Useful herein are chlorine dioxide gas forming agents described in International Patent Application No. PCT/US2019/060937 and in U.S. Publication No. 2019/00335746 A1, each of which is incorporated herein by reference in its entirety as if fully set forth herein. Disclosed in PCT/US2019/060937 is a chlorine dioxide gas forming agent that comprises acidified silica gel, an active compound and a moisture trigger. The acidified silica gel preferably has a pH of from 1.4 to 3.1 and is 50% to 90% by weight with respect to the total weight of the antimicrobial releasing agent. The active compound preferably comprises a metal chlorite and is from 5% to 30% by weight with respect to the total weight of the antimicrobial releasing agent. The trigger preferably comprises a hygroscopic compound and is from 2% to 20% by weight with respect to the total weight of the antimicrobial releasing agent. In one optional embodiment, the chlorine dioxide gas forming agent comprises, consists essentially of or consists of from 10% to 15% sodium chlorite, from 5% to 15% calcium chloride, and from 70% to 80% acidified silica gel by weight based on the total weight of the chlorine dioxide gas forming agent. In optional embodiments, the entrained polymer composition comprises sodium chlorite, calcium chloride, silica gel, ethyl vinyl acetate and polyethylene glycol.

Alternative chlorine dioxide gas forming agents are disclosed and prepared as set forth in U.S. Pat. No. 6,676,850, incorporated by reference in its entirety. Example 6 of that patent describes a formulation that is particularly suitable as a chlorine dioxide gas forming agent. The product is provided commercially under the brand ASEPTROL® 7.05 by BASF Catalysts LLC. The product is a formulation of sodium chlorite as the chlorine dioxide gas forming agent, a base catalyst and a trigger.

Optionally, in one embodiment, an entrained polymer may be a three phase formulation including about 50% by weight of ASEPTROL® 7.05 chlorine dioxide gas forming agent (from Engelhard Corp., Iselin, New Jersey, USA) in the form of the powdered mixture or another chlorine dioxide gas forming agent, about 38% by weight ethyl vinyl acetate (EVA) as a base polymer and about 12% by weight polyethylene glycol (PEG) as a channeling agent. Alternatively, an entrained polymer may be a three phase formulation including about 50% by weight of a chlorine dioxide gas forming agent, about 43% by weight EVA as a base polymer and about 7% by weight PEG as a channeling agent.

The aforementioned chlorine dioxide gas forming agents, especially when present in an entrained polymer in high weight percentages (e.g., 40% to 70% by weight of the total entrained polymer composition) can render the entrained polymer film brittle or susceptible to breaking or cracking. This could be the case with entrained polymer films that have high mineral content in general. As such, the film itself could potentially be troublesome to handle and secure to another surface, e.g., via heat staking or point bonding. Use of a carrier (e.g., woven or nonwoven material) in conjunction with the film can make the film much more robust for handling and processing.

Figure 2:
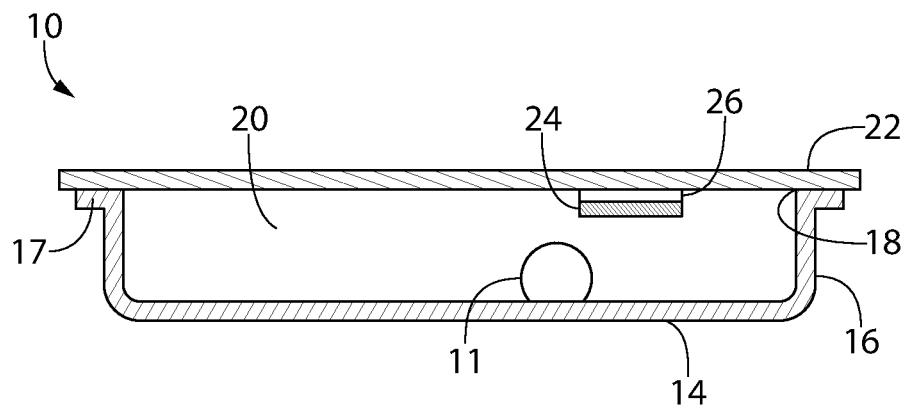
FIG. 2 is a cross-sectional elevation view of the package taken along line A-A in FIG. 1, wherein one configuration of the coextruded active member and carrier is shown in a magnified state for clarity of the invention only.
Figure 3:
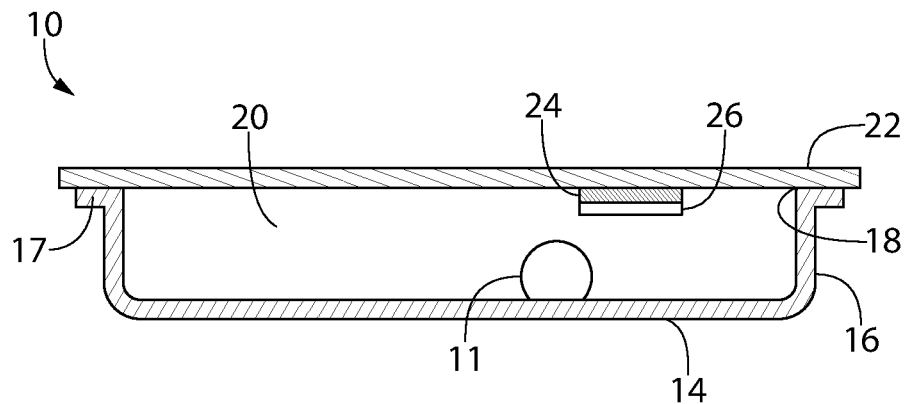
FIG. 3 is a cross-sectional elevation view of the package taken along line A-A in FIG. 1, wherein another configuration of the coextruded active member and carrier is shown in a magnified state for clarity of the invention only.

Referring now in detail to the figures, wherein like reference numerals refer to like parts throughout, FIGS. 1-3 shows a package or container, generally designated 10, which may be used according to an aspect of the disclosed concept. The package 10 can optionally be designed to hold, store, and/or otherwise preserve product 11, such as but not limited to one or more perishable products.

Optionally, the package 10 can include a body or tray having a base 14 and a sidewall 16 extending upwardly therefrom. An end of the sidewall opposite the base 14 can form a rim 17 that defines and/or surrounds an opening 18 of the body. Optionally, the rim 17 or at least a portion thereof extends parallel to the base 14 and/or perpendicularly to the sidewall 16. The body defines a cavity 20 formed by the base 14 and the sidewall 16.

Optionally, the package 10 can include a lidding film 22 configured to attached to the rim 17, extend over the opening 18 of the body, and enclose the cavity 20. The lidding film 22 can be thin, flexible, and/or formed of a transparent, translucent, or opaque material, optionally made from a polymer, such that product 11 or contents of the package 10 or body are generally visible from an exterior environment or not visible. Optionally, the lidding film 22 can be polyethylene terephthalate (PET) or cast polypropylene (CPP), for example. Although FIGS. 2 and 3 show the lidding film 22 as having the same or a similar thickness as the base 14 and the sidewall 16, the thickness of the lidding film 22 can be significantly thinner than the base 14 and/or the sidewall 16.

Optionally, a carrier 24 can be attached to the lidding film 22 or another portion of the package 10. The carrier 24 can optionally be formed of nonwoven material (e.g., TYVEK®), woven material, or any material that has a sufficient and/or predetermined range of moisture vapor transmission rate (MVTR) and/or air permeability to permit and/or enable the functionality described herein. For example, the carrier 24 preferably permits sufficient flow of moisture, air, and/or other gases through it to access or reach the active member 26 so that the active member 26 can perform its desired function (e.g., absorbing moisture or releasing a gas into the package interior, for example).

Optionally, the package 10 can include an active agent and/or an active member 26 attached to, integrated with, and/or coextruded with the carrier 24. For simplicity and clarity only, the coextruded active agent or active member, in combination with the carrier is sometimes referred to herein as the "combination," and identified in FIG. 1 as reference number 28. In one embodiment, the combination 28 can be visible to a purchaser when the lidding film 22 is closed or attached to the rim 17. In another embodiment, the combination 28 can be hidden or obscured by the lidding film 22 itself or a label or advertisement, for example, attached to an exterior surface of the lidding film 22.

Optionally, in any embodiment, the carrier 24 is a layer of material that is different in composition from the active member 26. Optionally, the carrier 24 and the active member 26 are each of substantially uniform thickness across their respective lengths and widths. Optionally, the carrier 24 and the active member 26 layers are coextensive with each other.

In one optional embodiment, the active member 26 is in the form of a film. Optionally, the active member 26 is in the form of an entrained polymer film, optionally including a base polymer, an active agent, and optionally a channeling agent. The presently disclosed technology is not limited to use with or for antimicrobials. For example, the active agent can optionally include least one of an antimicrobial, a releasing agent, or a desiccant.

The combination 28 can optionally be attached to an interior surface of the lidding film 22. However, the combination 28 is not limited to such a position. For example, the combination 28 can be attached to any portion or internal surface of the package 10, such as a vertical sidewall 16 thereof in the embodiment where the package 10 is a flexible bag.

In one optional embodiment, as shown in FIG. 2, the active member 26 can be positioned between the carrier 24 and an interior or bottom surface of the lidding film 22, such that the active member 26 is located therebetween. In another optional embodiment, as shown in FIG. 3, the carrier 24 can be positioned between the active member 26 and the interior or bottom surface of the lidding film 22, such that the carrier 24 is located therebetween.

In yet another optional embodiment, the active member 26 can be positioned between the carrier 24 and an interior surface of the package 10, such as the sidewall 16 thereof, such that the active member 26 is located therebetween. In still another optional embodiment, the carrier 24 can be positioned between the active member 26 and the interior of the package 10, such as the sidewall 16 thereof, such that the carrier 24 is located therebetween.

The carrier 24, which can provide a desired bonding or structural surface for the active agent and/or the active member 26, can strengthen or provide rigidity to the active agent and/or the active member 26, such that the active agent and/or the active member 26 need not be directly attached to the interior of the package 10 and/or the lidding film 22 in its entirety or along the entire surface area thereof. Instead, the carrier 24, with the active agent and/or the active member 26 coextruded therewith, can be attached (e.g., heat staked) to the interior of the package 10 or the lidding film 22 in certain spots or at certain locations (e.g., point bond).

In one embodiment, such a configuration allows air to move between the active member 26 and the lidding film 22, which is not possible with prior art methods. Increased air access to the active agent and/or the active member 26 allows the active member 26 to be more effective and/or efficient. The configuration is also stronger, less likely to come apart in the package 10, and/or easier to adhere to the lidding film 22. A nonwoven material, which is air permeable and/or can be coextruded, is an excellent optional carrier for this embodiment.

With the presently disclosed technology, even if the coextruded active member 26 and carrier 24 eventually come off or are separated from the interior surface of the package 10 and/or the lidding film 22, the active member 26 will necessarily be attached to the carrier 24, so the active member 26 is not a contamination hazard with respect to the product 11.

An optional method of forming the presently disclosed technology includes coextruding the active member 26 with the carrier 24 (i.e., the combination 28). The combination 28 can be heat staked or point bonded to an interior surface of the package 10 and/or the lidding film 22. In one embodiment, the lidding film 22 can be attached to the body (e.g., the rim 17) to cover the opening 18 such that the combination is exposed to the cavity 20 of the body.

To verify the superior characteristics of the presently disclosed technology, seal tests were conducted. In particular, tensile tests with a Mark-10 Force gauge and motorized test stand were conducted on an active member in the form of antimicrobial film. The tests were performed with and without nonwoven on one side sealed to lidding film.

A comparison was conducted between standard 0.3 mm thick antimicrobial film versus 0.3 mm thick antimicrobial film with nonwoven lamination for seal strength to PET/CPP lidding film (cast polypropylene being the side sealed to in the test, which was approximately 120 gauge thick). Antimicrobial film, which had high mineral loading, was sealed to the lidding film with an American International Electric (AIE-300FL) Impulse Foot Sealer, which is a Nichrome wire 450W sealer used for sealing plastics. The two films were sealed to the lidding film at different timed intervals set by the Sealer. Intervals of 2, 3, 4, 5, and 6 seconds was set to seal both films at the same time (side by side) to the lidding film for the test to reduce variability. The results of the comparison are shown in Table 1 below.

TABLE 1

| Time (seconds) | Coextraded Nonwoven and Antimicrobial Film (pounds of force) - Presently Disclosed Technology | Antimicrobial Film (pounds of force) - Prior Art |
|---|---|---|
| 2 | No seal | No Seal |
| 3 | 0.18 | 0.56 |
| 4 | 0.84 | 0.72 |
| 5 | 1.90 | 0.74 |
| 6 | 3.12 | 0.74 |

The above relates to the width of the film tested, which was 12 mm. As shown in Table 1, it was found that when coextruded nonwoven and antimicrobial film was sealed to lidding film for 6 seconds, the coextruded nonwoven and antimicrobial film separated from the lidding film when 3.12 lbF was applied. In contrast, when antimicrobial film was sealed to the lidding film for 6 seconds, the antimicrobial film separated from the lidding film when 0.74 lbF was applied. The coextruded nonwoven and antimicrobial film performed better than the antimicrobial film alone, even at a seal time of only 4 seconds.

In conclusion, the results show that a much stronger and better seal is achieved with the combined nonwoven and active member (coextruded) sealed to the lidding film, as the antimicrobial film by itself at most gets 0.74 lbF, while the combined nonwoven and active member (coextruded) can endure up to 3.12 lbF.

Figure 4:
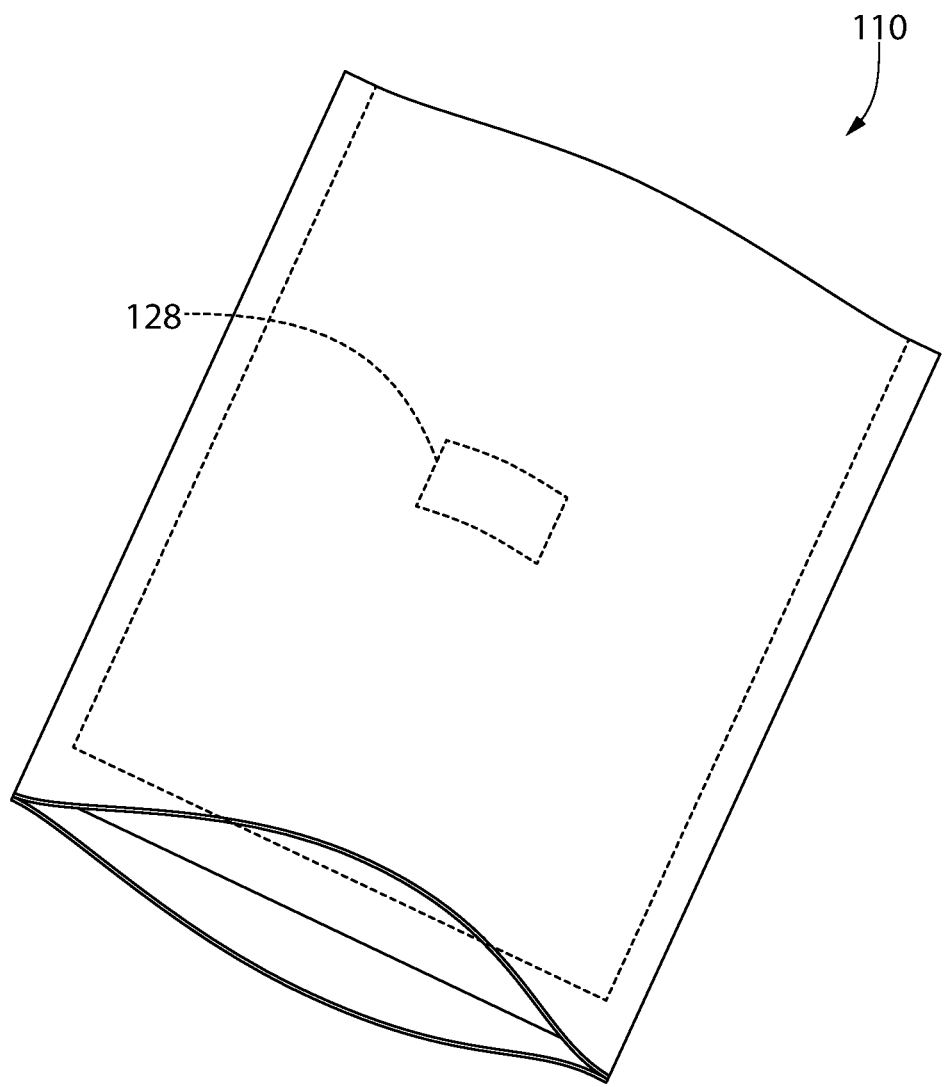
FIG. 4 is a perspective view of a package according to another optional embodiment of the presently disclosed technology, wherein a coextruded active member and carrier are shown in phantom for clarity of the invention only.

FIG. 4 shows another embodiment of the package 110 of the presently disclosed technology. Similar or identical structure as between the embodiments of FIGS. 1-3 and the embodiment of FIG. 4 is distinguished in FIG. 4 by a reference number with a magnitude one hundred (100) greater than that shown in FIGS. 1-3. Description of certain similarities between the embodiments of FIGS. 1-3 and the embodiment of FIG. 4 may be omitted herein for convenience and brevity only.

The package 110 can optionally be in the form of a flexible bag, for example, formed from a roll of film. More specifically, the package 110 can optionally be a stand-up pouch. The combination 128 can be attached to an interior sidewall of the package 110.

The following exemplary embodiments further describe optional aspects of the presently disclosed technology and are part of this Detailed Description. These exemplary embodiments are set forth in a format substantially akin to claims (each set including a numerical designation followed by a letter (e.g., "A," "B," etc.), although they are not technically claims of the present application. The following exemplary embodiments refer to each other in dependent relationships as "embodiments" instead of "claims."

1A. A method of coextruding a film and a carrier, wherein the film includes an active component.

2A. The method of embodiment 1A, wherein the active component includes at least one of an antimicrobial agent, a releasing agent, or a desiccant.

3A. The method of embodiment 1A or 2A, wherein the active component includes an entrained polymer formed of a base polymer, an antimicrobial releasing agent, and optionally a channeling agent.

4A. The method of any one of embodiments 1A-3A, wherein the active component is an entrained polymer film.

5A. The method of any one of embodiments 1A-3A, wherein the carrier is a woven.

6A. The method of any one of embodiments 1A-3A, wherein the carrier is a nonwoven.

1B. A package configured to preserve produce, the package comprising:
a body having a base and a sidewall extending upwardly therefrom, an end of the sidewall opposite the base forming an opening of the body, the body defining a cavity formed by the base and the sidewall;
a lidding film extending over the opening of the body and enclosing the cavity;
a carrier attached to the lidding film; and
an active member coextruded with the carrier.

2B. The package of embodiment 1B, wherein the active member is positioned between the carrier and the lidding film.

3B. The package of embodiment 1B, wherein the carrier is positioned between the lidding film and the active member.

4B. The package of any one of embodiment 1B-3B, wherein the active member includes at least one of an antimicrobial agent, a releasing agent, or a desiccant.

5B. The package of any one of embodiment 1B-4B, wherein the active member is an entrained polymer film.

6B. The package of any one of embodiments 1B-5B, wherein the carrier is a nonwoven.

7B. The package of any one of embodiments 1B-5B, wherein the carrier is a woven.

8B. The package of any one of embodiments 1B-5B, wherein the carrier is a material having sufficient MVTR to permit moisture and/or air penetrability to access the active member.

9B. The package of any one of embodiments 1B-8B, further comprising product within the body.

10B. The package of embodiment 9B, wherein the product is perishable.

11B. The package of any one of embodiments 1B-10B, where the lidding film is transparent or translucent.

12B. The package of any one of embodiments 1B-11B, wherein the active member includes an entrained polymer formed of a base polymer, an antimicrobial releasing agent, and optionally a channeling agent.

13B. The package of embodiment 12B, wherein the base polymer is in a range from 10-70%, optionally from 15-60%, optionally from 15-50%, optionally from 15-40%, optionally from 20-60%, optionally 20-50% by weight of the entrained polymer.

1C. A method of coextruding an entrained polymer film and a carrier, the entrained polymer film including a base material and an antimicrobial releasing agent, the carrier being a nonwoven material.

2C. The method of embodiment 1C, wherein the entrained polymer further includes a channeling agent.

1D. A package configured to preserve or inhibit pathogens on a product therein, the package comprising:
a combination point bonded, heat staked or otherwise affixed to an interior surface of a lidding film covering an opening of a body of the package, the combination formed of an active member coextruded with a carrier, the active member including an entrained polymer film having a base polymer and an active agent.

2D. The package of embodiment 1D, the active agent being one of an antimicrobial, a releasing agent, or a desiccant.

3D. The package of embodiment 1D or 2D, wherein the entrained polymer film includes a channeling agent.

4D. The package of any one of embodiment 1D-3D, wherein the carrier is formed of a nonwoven material.

5D. The package of any one of embodiment 1D-3D, wherein the carrier is formed of a woven material.

1E. A package configured to preserve or inhibit pathogens on a product therein, the package comprising:
an active member coextruded to a carrier, the combined active member and carrier being attached to an interior surface of the package.

2E. The package of embodiment 1E, wherein the package is in the form of a tray, and wherein the combined active agent and carrier are attached to a lidding film enclosing a cavity formed by the tray.

While the presently disclosed technology has been described in detail and with reference to specific examples thereof, it will be apparent to one skilled in the art that various changes and modifications can be made therein without departing from the spirit and scope thereof. It is understood, therefore, that the presently disclosed technology is not limited to the particular embodiments disclosed, but it is intended to cover modifications within the spirit and scope of the present presently disclosed technology as defined by the appended claims.

What is claimed is:

1. A package configured to preserve a product or inhibit pathogens on the product therein, the package comprising:
an active member coextruded to a carrier, the combined active member and carrier being point bonded to an interior surface of the package, the active member comprising a mineral loaded polymer having a mineral active agent comprising 40% to 70% by weight of the mineral loaded polymer; and
wherein the active member and the carrier are coextensive with each other.

2. The package of claim 1, wherein the mineral loaded polymer is an entrained polymer film having a base polymer and the mineral active agent.

3. The package of claim 2, wherein the entrained polymer film further includes a channeling agent.

4. The package of claim 2, wherein the active agent is a chlorine dioxide gas forming agent comprising acidified silica gel, a metal chlorite, and a moisture trigger.

5. The package of claim 4, wherein the acidified silica gel has a pH in a range from 1.4 to 3.1 and is 50% to 90% by weight with respect to a total weight of a chlorine dioxide gas releasing agent, the metal chlorite is in a range from 5% to 30% by weight with respect to the total weight of the chlorine dioxide gas releasing agent and the moisture trigger is a hygroscopic compound that is in a range from 2% to 20% by weight with respect to the total weight of the chlorine dioxide gas releasing agent.

6. The package of claim 5, wherein the metal chlorite is sodium chlorite and the moisture trigger is calcium chloride.

7. The package of claim 1, wherein active member has at least one of absorbing, adsorbing, releasing activity, or releasing capacity.

8. The package of claim 1, wherein the carrier is formed of a nonwoven material.

9. The package of claim 1, wherein the carrier is formed of a woven material.

10. The package of claim 1, wherein the interior surface is part of a film that encloses a cavity formed by the package, and wherein the film is formed of a flexible polymer.

11. The package of claim 10, wherein the active member is positioned between the film that encloses the cavity and the carrier.

12. The package of claim 10, wherein the carrier is positioned between the film that encloses the cavity and the active member.

13. The package of claim 1, wherein the active member is configured to release a gas or other volatile component.

14. The package of claim 1, wherein the active member has absorbing or adsorbing capacity.

15. The package of claim 1, the package further comprising:
a tray having a base and a sidewall extending upwardly therefrom and terminating in a rim, the rim surrounding an upper opening of the tray; and
the film that encloses the cavity being a lidding film attached to the rim to enclose product stored in a cavity of the tray, the lidding film being formed of polyethylene terephthalate (PET) or cast polypropylene (CPP), wherein the active member has adsorbing or absorbing capacity, or is capable of releasing a gas or other volatile component, the carrier being formed of a nonwoven material.

16. The package of claim 15, wherein the active member is positioned between the lidding film and the carrier.

17. The package of claim 15, wherein the carrier is positioned between the lidding film and the active member.

18. A method of preserving product in a package or inhibiting pathogens on the product in the package, the method comprising:
coextruding an active member and carrier, the active member being an entrained polymer film having at least one of absorbing, adsorbing or releasing capacity or activity, the entrained polymer film having an active agent in the form of minerals comprising 40% to 70% by weight of the entrained polymer film, wherein the active member and the carrier are coextensive with each other; and
point bonding the coextruded active member and carrier to an interior surface of a package.

19. The method of claim 18, wherein the coextruded active member and carrier is attached to an interior surface of film of the package.

20. The method of claim 18, wherein the carrier is formed from a nonwoven material.

21. The method of claim 18, wherein the carrier is formed from a woven material.

22. The method of claim 18, wherein the entrained polymer film includes a base polymer and the active agent.

23. The method of claim 22, wherein the entrained polymer film further includes a channeling agent.

24. The method of claim 18, wherein the film of the package is formed of a flexible polymer.

25. The method of claim 18, wherein the active member is positioned between the film of the package and the carrier when the coextruded active member and carrier are attached to the lidding film.

26. The method of claim 18, wherein the carrier is positioned between the film of the package and the active member when the coextruded active member and carrier are attached to the film of the package.

27. The method of claim 18, wherein the active agent is a chlorine dioxide gas forming agent comprising acidified silica gel, a metal chlorite, and a moisture trigger.

28. The method of claim 27, wherein the acidified silica gel has a pH in a range from 1.4 to 3.1 and is 50% to 90% by weight with respect to a total weight of a chlorine dioxide gas releasing agent, the metal chlorite is in a range from 5% to 30% by weight with respect to the total weight of the chlorine dioxide gas releasing agent and the moisture trigger is a hygroscopic compound that is in a range from 2% to 20% by weight with respect to the total weight of the chlorine dioxide gas releasing agent.

29. The method of claim 28, wherein the metal chlorite is sodium chlorite and the moisture trigger is calcium chloride.

\* \* \* \* \*